G. W. Bigelow.

Rifling Machine.

Nº 38,000. Patented Mar. 24, 1863.

Witnesses.
Rufus Sanford
John E. Earle

Inventor:
George W. Bigelow

UNITED STATES PATENT OFFICE.

GEORGE W. BIGELOW, OF NEW HAVEN, CONNECTICUT, ASSIGNOR TO H. B. BIGELOW, OF SAME PLACE.

IMPROVEMENT IN RIFLING-MACHINES.

Specification forming part of Letters Patent No. 38,000, dated March 24, 1863.

*To all whom it may concern:*

Be it known that I, GEORGE W. BIGELOW, of the city and county of New Haven, and State of Connecticut, have invented new and useful Improvements in Rifling-Machines; and I do hereby declare the following to be a full, clear, and exact description of its construction and operation, reference being had to the accompanying drawings, making part of this specification, in which—

Figure 1:
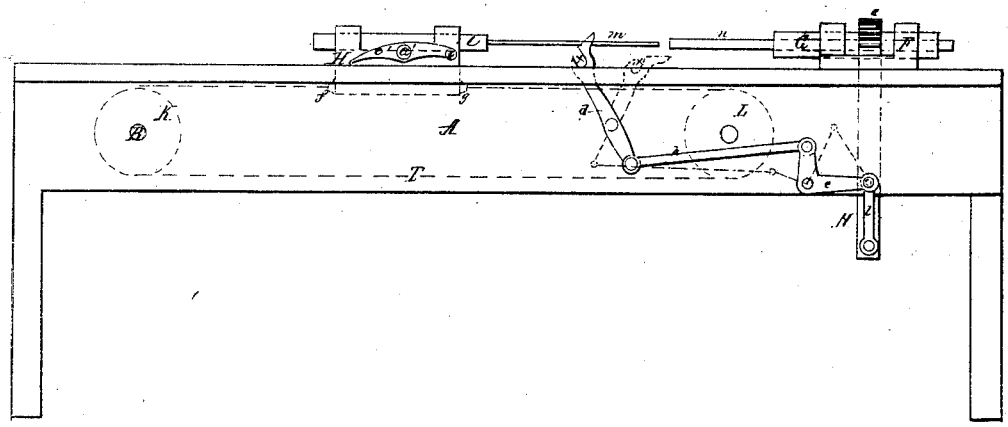
Figure 2:
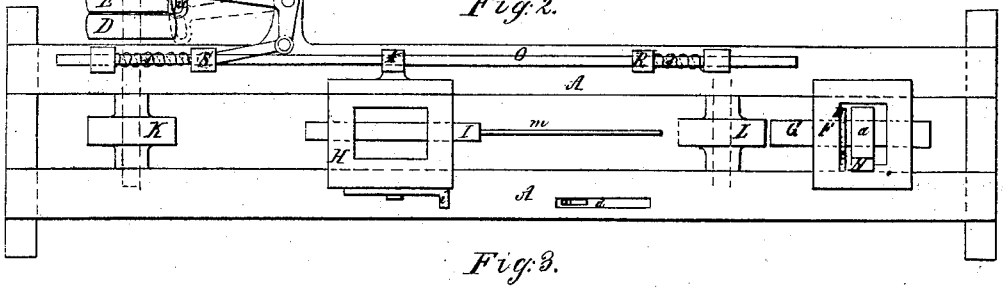
Figure 3:
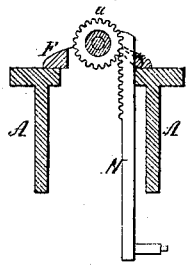

Figure 1 is a side view. Fig. 2 is a plan of the same, and Fig. 3 a transverse section through X Y.

Same letters and characters refer to like parts.

In the rifling-machines in general use a reciprocating motion is imparted to the rifling-rod from a crank-wheel, necessarily large to give the required length of stroke, and, as in all cases where a crank is employed for such a motion, the velocity imparted is irregular—that is, a decreasing velocity as the crank approaches the dead-center, and increasing as the crank continues its revolution from the same dead-center, thus occupying a proportionately longer time to do the work, as the quickest velocity would be desirable throughout the entire stroke, if that velocity could be constant—an impossibility in using the crank. The wheel and the mechanism by which it gives to the rifling-rod its requisite stroke necessarily occupies a large space. This, together with the loss of time consequent upon the unequal velocity before referred to, are great objections to the rifling-machines now in general use.

The object of my invention is to overcome these objections. It consists in imparting to the cross-head of a rifling-machine, to which the rifling-rod is fixed, reciprocating motion by attaching to the cross-head the two ends of a band, or its equivalent, and passing the said band around a pulley at each end of the machine in such a manner as that by the revolution of the two pulleys the cross-head will be drawn toward one end of the machine until the revolution of the pulleys is reversed. Then the cross-head will be drawn in the opposite direction; also, in combining with the above-mentioned cross-head mechanisms which make the machine automatic in its operation.

To enable others skilled in the art to make and use my improved rifling-machine, I will proceed to describe its construction and operation.

A is the bed or frame on which the operative mechanism is placed, and is not unlike the beds of other rifling-machines.

B is the driving-shaft, on which are two fixed pulleys, C and D, and a loose pulley, E.

I represent this machine as to be driven by two belts—one direct, the other crossed, to give a reversed motion—and adjusted so that but one can be on a fixed pulley, while the other will run on a loose pulley. Then, by shipping the belt the last driving-belt will run onto the loose pulley, and the other or reverse belt will run onto the other fixed pulley and reverse the action of the machine. I illustrate driving my machine by this method, it being simple; but the same result may be obtained in various ways, as, for instance, the common iron-planer.

K is a pulley fixed to the driving-shaft B.

H is the cross-head, in the mandrel I of which is fixed a common rifling-rod, $m$. This cross-head does not differ materially in mode of construction from that of the common rifling-machines. To this cross-head I attach the two ends $f$ and $g$ of a band, T, or its equivalent, the said band passing over the pulley K at the head of the machine and over the pulley L at the foot.

F is a head fixed to the bed of the machine; G, a mandrel, through which is placed and fixed the barrel $n$ to be rifled. On the mandrel G is a spur-gear, $a$—may be a segment, as but a partial revolution is ever required.

N is a rack which has a vertical movement for the purpose of revolving the mandrel G through the gear $a$.

$b$ is a ratchet, and $c$ a pawl to hold the mandrel from returning as the rack descends.

$d$ and $e$ are levers, and $h$ and $l$ their connections to operate the rack N. These are actuated by a trip, $i$, on the cross-head H.

O is the reversing-rod, to which is attached a belt-shipper, P, and is operated by a sleeve, $k$, on the cross-head, which moves freely on the rod O, and as it (the sleeve $k$) reaches either of the two stops R or S, (fixed on the rod to give the requisite length of movement, yet adjustable to vary that length,) forces the rod in the same direction in which the cross-head is moving until the shipper P runs the belt from fixed to loose pulley and from loose to fixed. Thus reversing the movement, the cross-head will return to the other, stop, force back the rod, and with it return the two belts to their former position, and so the cross-head will continue to traverse, driving and drawing the rifling rod to and from the barrel with a steady, constant, and equal velocity.

To operate my improved rifling-machine, I fix the barrel $n$ in the mandrel G, the rifling-rod $m$ in the mandrel I, and cause the rod to revolve, all in similar manner to the common rifling-machine. The rod and barrel being properly adjusted, I apply the power to the driving-shaft B, and, through the agency of the band T, I drive the cross-head H toward, and the rifling rod $m$ into, the barrel $n$. The said cross-head continues so to move until the sleeve reaches the stop R, and presses upon it with sufficient force to change the shipper P from the position denoted in black to that denoted in red. I place spiral springs $s\,s$, or their equivalents, upon the rod O to relieve the shipper from a too sudden strain or forcible blow from the action of the cross head. These, for the good of the machine, I find indispensable, but not necessary when that is not taken into consideration; but from my experience I prefer to use them. The belt through the eye $t$ of the shipper P will draw the cross head toward the barrel, as last described, while the belt in the eye $u$ of the shipper is a cross-belt, or produces a reverse motion to the other, and while the first is driving the shaft of the fixed pulley the other is running the loose pulley E in the opposite direction; but after the change of the shipper, in the manner described, the cross or reversible belt is led onto the other fixed pulley, D, and the other or forward belt onto the loose pulley. The consequence is the motion of the driving-shaft is reversed, and with it the cross-head H, which now withdraws the rod from the barrel and recedes until the sleeve $k$ reaches the other stop, S, and forces the shipper back into the first position, and so will continue to advance and recede, as described, until the power is removed. At each operation it is required to give to the barrel a partial revolution, which is accomplished by the action of a trip, $i$, on the cross-head, in the following manner: The trip $i$ is hung upon a pivot at $a'$ and turns freely thereon, and is nearly balanced by a tail-piece, $c'$. As the cross-head advances toward the fixed head F this trip $i$ will come against the lever $d$ and carry it over to the position denoted in red. In this movement, by a connection of levers and rods, $h\ e\ l$, the rack N rises, and, by its cogs working into the cog-wheel $a$, causes the mandrel G, in which the barrel is fixed, to revolve. This may be adjustable to give the requisite revolution to the barrel, should the cross-head pass further on than to give the requisite revolution to the mandrel. The top of the lever is extended in such form as (see in red, Fig. 1) that the trip may ride over without further action upon the lever, and in its return will strike against the shorter end, $d'$, of the lever $d$, and, owing to the inclination of the said end $d'$, will cause the trip to turn and fall into the slot $x$ and draw back the lever to its first position, in which operation the rack descends, but by the usual arrangement of ratchet and pawl the mandrel does not return the pinion-spring on the mandrel, and thus at each movement of the cross-head the barrel is revolved, as may be required.

In describing the operation of my machine I have illustrated and described the power as applied through two belts—one direct, the other cross; but, as I have before stated, a single belt may be used and the reverse motion given through gearing in similar manner to the common iron-planer, which undoubtedly is the better way. Again, by substituting a rack for the band T and making the pulley K a pinion (the said rack fixed to the cross-head) will produce the same result. Therefore I do not confine myself strictly to the mode described for accomplishing the specified result and overcoming the objections described in the introduction to this specification.

I am aware of the patents of C. Sharp, December 2, 1862; also the patent of Titus Powers, of same date, in both of which there exists, to some extent, the principal objection; but What I do claim as new and useful is—

The combination of the cross-head trip $i$ and lever $d$ with the rack N and pinion O, when the same are combined to operate substantially as and for the purpose specified.

GEORGE W. BIGELOW.

Witnesses:
RUFUS SANFORD,
JOHN E. EARLE.